(12) United States Patent
Theis et al.

(10) Patent No.: US 11,386,599 B2
(45) Date of Patent: *Jul. 12, 2022

(54) FEATURE TRANSFER

(71) Applicant: Magic Pony Technology Limited, London (GB)

(72) Inventors: Lucas Theis, London (GB); Zehan Wang, London (GB); Robert David Bishop, London (GB)

(73) Assignee: Twitter, Inc., San Francisco, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 15/929,625

(22) Filed: May 13, 2020

(65) Prior Publication Data
US 2020/0273224 A1 Aug. 27, 2020

Related U.S. Application Data

(63) Continuation of application No. 15/856,777, filed on Dec. 28, 2017, now Pat. No. 10,699,456, which is a (Continued)

(30) Foreign Application Priority Data

May 11, 2016 (GB) ...................... 1608259

(51) Int. Cl.
*G06V 20/00* (2022.01)
*G06T 11/60* (2006.01)
(Continued)

(52) U.S. Cl.
CPC ................ *G06T 11/60* (2013.01); *G06T 5/50* (2013.01); *G06T 7/30* (2017.01); *G06T 7/33* (2017.01);
(Continued)

(58) Field of Classification Search
CPC ........ G06K 9/48; G06K 9/4609; G06T 11/60; G06T 5/50; G06T 5/001; G06T 7/30;
(Continued)

(56) References Cited

U.S. PATENT DOCUMENTS 5,813,018 A * 9/1998 Kaji ........................ G06T 11/60
715/236
6,570,592 B1 5/2003 Sajdak et al.
(Continued)

FOREIGN PATENT DOCUMENTS

| CN | 102521807 A | 6/2012 |
| WO | 2016132152 A1 | 8/2016 |
| WO | 2017/194945 A1 | 11/2017 |

OTHER PUBLICATIONS

U.S. Appl. No. 15/856,777, filed Dec. 28, 2017, Allowed.
(Continued)

*Primary Examiner* — Amir Alavi
(74) *Attorney, Agent, or Firm* — Brake Hughes Bellermann LLP

(57) ABSTRACT

A method for developing visual data using source data, target data, and a hierarchical algorithm. According to a first aspect, there is provided a method for developing visual data from source data, target data and using a hierarchical algorithm, the method comprising the steps of: determining an alignment between the target data and the source data; and producing the visual data by transferring one or more features of the source data onto one or more features of the target data; wherein, the visual data is produced after the step of determining the alignment between the target data and the source data; and wherein the visual data is produced using the hierarchical algorithm.

20 Claims, 5 Drawing Sheets

Related U.S. Application Data continuation of application No. PCT/GB2017/051310, filed on May 11, 2017.

(51) Int. Cl.
    *G06T 5/50*     (2006.01)
    *G06T 7/30*     (2017.01)
    *G06T 7/33*     (2017.01)

(52) U.S. Cl.
CPC ............... *G06T 2207/20081* (2013.01); *G06T 2207/20221* (2013.01); *G06T 2207/30201* (2013.01)

(58) Field of Classification Search
CPC .................... G06T 7/33; G06T 7/0083; G06T 2207/30201; G06T 2207/20221; G06T 2207/20081; G06N 3/08; G11B 27/28
See application file for complete search history.

(56) References Cited

U.S. PATENT DOCUMENTS

| | | | |
|---|---|---|---|
| 6,671,391 B1 | 12/2003 | Zhang et al. | |
| 7,242,460 B2 | 7/2007 | Hsu et al. | |
| 7,792,321 B2* | 9/2010 | Palmadesso | G06K 9/3241 |
| | | | 382/100 |
| 7,933,910 B2 | 4/2011 | Ishida et al. | |
| 8,068,652 B2 | 11/2011 | Avinash et al. | |
| 8,520,926 B2 | 8/2013 | Schilling | |
| 8,872,849 B2 | 10/2014 | Zhao et al. | |
| 9,418,438 B2* | 8/2016 | Ratcliff | G06T 7/74 |
| 9,785,858 B2 | 10/2017 | Seifert et al. | |
| 10,127,250 B2* | 11/2018 | Dingman | G06F 3/048 |
| 10,296,794 B2* | 5/2019 | Ratti | G06K 9/00785 |
| 10,311,332 B2* | 6/2019 | Bergsma | G06K 9/6215 |
| 10,346,421 B1* | 7/2019 | Heer | G06F 16/252 |
| 10,699,456 B2* | 6/2020 | Theis | G06T 5/50 |
| 11,093,745 B2* | 8/2021 | Redden | G06K 9/4623 |
| 2003/0190060 A1 | 10/2003 | Pengwu | |
| 2012/0197892 A1 | 8/2012 | Achtermann et al. | |
| 2013/0194294 A1 | 8/2013 | Zhao et al. | |
| 2014/0270347 A1 | 9/2014 | Ku et al. | |
| 2015/0029379 A1 | 1/2015 | Kim et al. | |
| 2015/0317788 A1 | 11/2015 | Van Baar et al. | |
| 2016/0086017 A1 | 3/2016 | Rodriguez et al. | |
| 2016/0350336 A1* | 12/2016 | Checka | G06K 9/4628 |
| 2018/0144526 A1 | 5/2018 | Theis et al. | |
| 2020/0193269 A1* | 6/2020 | Park | G06K 9/6271 |
| 2020/0273224 A1* | 8/2020 | Theis | G06T 5/50 |

OTHER PUBLICATIONS

Decision to Refuse A European Patent Application for EP Application No. 17724407.6, dated Feb. 27, 2020, 25 pages.
International Search Report for Application No. GB1608259.6, dated Nov. 14, 2016, 4 pages.
International Search Report and Written Opinion for PCT Application No. PCT/GB2017/051310, dated Sep. 8, 2017, 18 pages.
Al-Rfou, et al., "Theano: A Python framework for fast computation of mathematical expressions", arXiv:1605.02688, May 9, 2016, 19 pages.
Bansal, et al., "PixelNet: Towards a General Pixel-Level Architecture", arXiv:1609.06694v1, 2016, 12 pages.
Bitouk, et al., "Face swapping: Automatically replacing faces in photographs", In ACM Transactions on Graphics (SIGGRAPH), 2008, 8 pages.
Dale, et al., "Video face replacement", ACM Transactions on Graphics (SIGGRAPH), vol. 30, 2011, 10 pages.
Deng, et al., "ImageNet: A Large-Scale Hierarchical Image Database", IEEE Conference on Computer Vision and Pattern Recognition (CVPR), 2009, 8 pages.
Dieleman, et al., "Lasagne", retrieved on Jan. 3, 2017 from https://github.com/Lasagne/Lasagne, Aug. 2015, 3 pages.
Dieleman, et al., "Lasagne—Development", retrieved on Jan. 3, 2017 from http://lasagne.readthedocs.io/en/latest/user/development.html, 5 pages.
Dosovitskiy, "Generating images with perceptual similarity metrics based on deep networks", arXiv:1602.02644, 2016, 14 pages.
Fechner, et al., "Learning Target Masks In Infrared Linescan Imagery", Proceedings of SPIE, vol. 3077, Apr. 4, 1997, pp. 323-332.
Garrido, et al., "Automatic Face Reenactment", IEEE Conference on Computer Vision and Pattern Recognition (CVPR), Jun. 2014, pp. 4217-4424.
Gatys, et al., "Image style transfer using convolutional neural networks", CVPR, Jun. 2016, pp. 2414-2423.
Georghiades, et al., "From few to many: Illumination cone models for face recognition under variable lighting and pose", IEEE Trans. Pattern Anal. Mach. Intelligence, 23(6), 2001, pp. 643-660.
Github, "OpenCV Wiki", retrieved on Jan. 3, 2017 from https://github.com/opencv/opencv/wiki, 2016, 3 pages.
Goodfellow, et al., "Generative adversarial nets", Advances in Neural Information Processing Systems 27, 2014, 9 pages.
Hertel, et al., "Deep Convolutional Neural Networks As Generic Feature Extractors", 2015 International Joint Conference on Neural Networks, Jul. 12, 2015, 4 pages.
Johnson, et al., "Perceptual losses for real-time style transfer and super-resolution", ECCV 2016, Mar. 27, 2016, 17 pages.
Kemelmacher-Shlizerman, "Transfiguring portraits", ACM Transaction on Graphics, 35(4), Jul. 2016, 8 pages.
King, "Dlib-ml: A Machine Learning Toolkit", Journal of Machine Learning Research, vol. 10, Jul. 2009, pp. 1755-1758.
Kingma, et al., "Adam: A method for stochastic optimization", ICLR 2015, Jul. 23, 2015, 15 pages.
Korshunova, et al., "Fast Face-swap Using Convolutional Neural Networks", arXiv.org, Nov. 29, 2016, 9 pages.
Ledig, et al., "Photo-Realistic Single Image Super-Resolution Using a Generative Adversarial Network", Proceedings of the IEEE Conference on Computer Vision and Pattern Recognition, May 25, 2017, 19 pages.
Li, et al., "Combining markov random fields and convolutional neural networks for image synthesis", arXiv:1601.04589v1), Jan. 18, 2016, 9 pages.
Li, et al., "Convolutional network for attribute-driven and identity-preserving human face generation", arXiv:1608.06434, Aug. 23, 2016, 9 pages.
Li, et al., "Precomputed real-time texture synthesis with markovian generative adversarial networks", arXiv:1604.04382v1, Apr. 15, 2016, 17 pages.
Liu, et al., "Deep learning face attributes in the wild", Proceedings of International Conference on Computer Vision (ICCV), Dec. 2015, 9 pages.
Liu, et al., "Face Hallucination: Theory And Practice", International Journal of Computer Vision, vol. 75, No. 1, Feb. 15, 2007, pp. 115-134.
Liu, et al., "Multi-objective convolutional learning for face labeling", IEEE Conference on Computer Vision and Pattern Recognition (CVPR), Jun. 7-12, 2015, pp. 3451-3459.
Oliveira, et al., "Medical Image Registration: a Review", Computer Methods in Biomechanics and Biomedical Engineering, vol. 17, No. 2, Mar. 22, 2012, pp. 73-93.
Parkhi, "Deep face recognition", British Machine Vision Conference, 2015, 12 pages.
Paszke, et al., "ENet: A Deep Neural Network Architecture for Real-Time Semantic Segmentation", arXiv:1606.02147, Jun. 7, 2016, 10 pages.
Perez, et al., "Poisson image editing", ACM Transactions on Graphics, SIGGRAPH '03, 2003, pp. 313-318.
Ren, et al., "Face Alignment at 3000 FPS via Regressing Local Binary Features", IEEE Conference on Computer Vision and Pattern Recognition (CVPR), 2014, pp. 1685-1692.
Ronneberger, et al., "U-Net: Convolutional Networks for Biomedical Image Segmentation", MICCAI, 2015, 8 pages.
Saxe, et al., "Exact solutions to the nonlinear dynamics of learning in deep linear neural networks", arXiv:1312.6120, 2013, 22 pages.

(56) References Cited

OTHER PUBLICATIONS

Shih, et al., "Data-Driven Hallucination of Different Times of Day From a Single Outdoor Photo", ACM Transactions on Graphics, vol. 32, No. 6, Nov. 2013, pp. 1-11.
Shih, et al., "Style Transfer for Headshot Portraits", ACM Transactions on Graphics, vol. 33, No. 4, Jul. 27, 2014, pp. 1-14.
Simonyan, et al., "Very deep convolutional networks for large-scale image recognition", International Conference on Learning Representations, Apr. 10, 2015, 14 pages.
Sonderby, et al., "Amortised MAP Inference for Image Super-resolution", arXiv preprint arXiv:1610.04490, Oct. 14, 2016, 19 pages.
Suwajanakorn, et al., "What makes tom hanks look like tom hanks", 2015 IEEE International Conference on Computer Vision, Dec. 7-13, 2015, pp. 3952-3960.
Thies, et al., "Face2Face: Real-time Face Capture and Reenactment of RGB Videos", 2016, 9 pages.
Ulyanov, et al., "Texture networks: Feed-forward synthesis of textures and stylized images", International Conference on Machine Learning (ICML), Mar. 10, 2016, 16 pages.

* cited by examiner

FEATURE TRANSFER

CROSS-REFERENCE TO RELATED APPLICATIONS

This application is a continuation of, and claims priority to, U.S. patent application Ser. No. 15/856,777, filed on Dec. 28, 2017, entitled "DEVELOPING VISUAL DATA USING A HIERARCHICAL ALGORITHM", which is a continuation of, and claims priority to, International Patent Application No. PCT/GB 2017/051310, filed on May 11, 2017, entitled "FEATURE TRANSFER," which claims priority to United Kingdom Patent Application No. GB 1608259.6, filed on May 11, 2016, the contents of which are incorporated herein by reference in their entireties.

FIELD

The present disclosure relates to a method for developing visual data using source data, target data, and a hierarchical algorithm.

BACKGROUND

Transferring visual features from one image to another, in a seamless manner, has long been established as a problem in computer vision and graphics and has a number of uses and applications in a variety of areas, from image manipulation and editing to scientific applications.

In some cases, it may be desirable to transfer one or more features from one image (or a portion thereof) on to another image or image portion, thereby combining one or more features of some source data with one or more features of some target data.

Similarly, it may be desirable to enhance the resolution of visual data based upon visual data of a similar style and also improve the fidelity, for example by adding detail (aside from any changes or increases in resolution of the image).

In current methods images, or portions thereof, are simply overlaid or transplanted onto another image, without blending and/or adapting the features from one image to another. The transplanted features often do not blend very well with the target image meaning any output highlights incorrect alignment between the images. Furthermore, the lack of any blending between the transferred features often results in imperfect outputs which look unnatural and/or synthetic and out of place when compared to the content of the target image.

SUMMARY

Aspects and/or embodiments are set out in the appended claims. Some aspects and/or embodiments can improve output and the effectiveness when transferring one or more features from one input to another using machine learning techniques. These and other aspects and embodiments are also described herein.

Certain aspects and/or embodiments seek to provide techniques for generating hierarchical algorithms that can be used to create or develop visual data based on source data and target data.

Other aspects and/or embodiments seek to provide techniques for machine learning.

According to a first aspect, there is provided a method for developing visual data from source data, target data and using a hierarchical algorithm, the method comprising the steps of: determining an alignment between the target data and the source data; and producing the visual data by transferring one or more features of the source data onto one or more features of the target data; wherein, the visual data is produced after the step of determining the alignment between the target data and the source data; and wherein the visual data is produced using the hierarchical algorithm.

This can enable one or more features to be transferred from the source data to the target data in a more consistent and/or coherent manner, which may in some embodiments involve blending between the data.

In some implementations, the method may further comprise the steps of detecting one or more features within the target data; and/or detecting one or more features within the source data. This can enable the transfer of one or more features to occur on one or more regions of the source data and/or target data. It may also assist in maintaining consistency and/or coherency in the output when transferring features.

In some implementations, the step of determining an alignment between the target data and the source data may occur prior to the step of detecting one or more features within the target data and the source data. Alternatively, the step of determining an alignment between the target data and the source data may occur after the step of detecting one or more features within the target and source data, and wherein the step of determining an alignment occurs between the one or more detected features in the source data and the one or more detected features in the target data. This can enable the alignment to occur between the entirety of the source data and target data, or to occur only on the detected features.

In some implementations, the method may further comprise a step of segmenting the source data and/or target data. This can enable a more accurate transfer of feature by determining the types of areas within the source data and/or target data so as to ensure a more accurate transfer of features. For example, ensuring like features in the source data are transferred onto like features in the target data.

In some implementations, the step of producing the visual data by transferring one or more features of the source data onto one or more features of the target data may occur using one or more predetermined regions of the source data and/or the target data. This can enable the transfer to occur over the one or more predetermined regions only, leaving the remaining regions untouched.

In some implementations, the one or more detected features within the source data may comprise data indicative of a predetermined object, and in some embodiments the predetermined object may be a face of a person or facial features. Similarly, the target data may comprise data indicative of a predetermined object, wherein the predetermined object may a face of a person or facial features. Additionally, the predetermined objects may be an accessory, wherein an accessory may be any of a hat, glasses, mask, or an item of clothing, one or more earrings and/or piercings. This can enable different types of features within the source data and target data to be determined based upon the information contained within the source data and target data.

In some implementations, the steps of detecting one or more features comprises using one or more predetermined classifiers, wherein the predetermined classifier is any one or more of a Haar Feature-based Cascade classifier, a convolutional neural network, a neural network, a random forest, a decision tree, a Linear Discriminant Analysis classifier, a Naïve Bayes classifier, Logistic regression, perceptron, a support vector machine, or a k-nearest neighbour classifier.

In some implementations, the method may comprise the step of receiving the plurality of source data, and/or the step of receiving the target data. This can enable the source and target data to be stored remotely.

In some implementations, the target data may comprise a plurality of target visual data. This can enable one or more pieces of target visual data to be received as an input into the method.

In some implementations, the plurality of source data is selected such that a pre-determined similarity metric is maximized, or a distance function or metric is minimized. This can enable a more accurate detection of features based on pre-determined characteristics which may be set by the user of a system designed to execute the method.

In some implementations, the step of determining the alignment between the one or more features comprises a linear transformation function, and wherein the linear transformation function is at least one of; a scaling function, a rotation function, a translation function, or a shearing function. In some implementations, the linear transformation function may be applied to at least one of the target data, the source data, the detected features within the target data, or the detected features within the source data. This can enable the alignment to be determined using mathematical functions readily calculable by an apparatus designed to execute the method.

In some implementations, the step of determining the alignment between the one or more features may comprise a non-linear transformation function, wherein the non-linear transformation function may comprise applying a plurality of control points to at least one of the source data, the target data, the detected features within the target data, or the detected features within the source data. The control points may be arranged in a grid. This can enable an alignment to be determined between the control points applied to the source data and target data, so as to minimize the image difference between the source and target data. This may be achieved by maximising the pixel-wise or local similarity between the source data and target data and, in some embodiments, minimising the distance between the control points applied to the target data and the control points applied to the source data. In further embodiments, it may be advantageous to use an alignment algorithm, which may be a hierarchical algorithm, for example a spatial transformer network, to achieve an alignment between the source data and target data. Wherein the alignment algorithm receives a first piece of data and a second piece of data as an input and may have learned to align the first with the second. In other embodiments, a first piece of data may be inputted into the alignment algorithms, wherein the hierarchical algorithm has learned to align with respect to a second piece of data contained in memory.

In some implementations, the non-linear transformation function further comprises searching for one or more changes to the plurality of control points so as to align the target data with the source data. The searching may be performed by any of a gradient descent, a quasi-Newton method, a conjugate gradient method, an interior point method, a subgradient method, a bundle method of descent, an ellipsoid method, a reduced gradient method, or a simultaneous perturbation stochastic approximation. Alternatively, the searching may be performed by a nearest neighbour search with regards to a plurality of results received from applying a plurality of predetermined transformations. This enables the most appropriate control points to be selected when determining the alignment.

In some implementations the step of determining the alignment between the one or more features comprises steps of detecting a plurality of keypoints, and aligning the plurality of keypoints. The keypoints may be determined for at least one of the target data, the source data, the detected features within the target data, or the detected features within the source data, and the step of determining the alignment between the one or more features may further comprise applying a Procrustes analysis to determine a set of transformation functions to align the plurality of keypoints. The set of transformation functions may comprise at least one linear transformation function or non-linear transformation function, and a keypoint may be a unique point associated with one or more detected features. The unique point may be defined in the feature space and/or the native pixel space. The use of keypoints to determine an alignment can enable a plurality of transformations to be applied to the source data and target data, and the most appropriate set of transformations selected.

In some implementations, the step of applying the source data may comprise the step of determining one or more thresholds on the colour channels of the target data. Additionally, the method may further comprise step of blending the applied source data with the target data. This can enable a smooth transition, and the removal of any artefacts which may be created when applying the features of the source data to the target data.

In some implementations, the step of applying the source data may occur on any of a subset of the detected features, or a segment of the target image. Furthermore, the one or more detected features may be representative of any one or more of, an eye of the person, both eyes of the person, an ear of the person, both ears of the person, a nose of the person, a mouth of the person, a chin of the person, an eyebrow of the person, both eyebrows of the person, a cheek of the person, both cheeks of the person, a forehead of the person, the head of a person, or a plurality of hairs or hairstyle of the person, or any point within. This can enable the source data, or a portion thereof, to be applied to a portion of the target data only.

In some implementations, the amount of source data applied to the target data may be controllable by a user of a system designed to execute the method. This can enable the amount of source data applied to the target data to be determined by a user of the system.

In some implementations, different source data may be applied to the one or more detected features. This can enable different detected features from different source data to be applied to different portions of the target data.

In some implementations, the target data may comprise any of a single frame visual, a sequence of frames of target data, or a region within a frame or sequence of frames of target data, which may be any of an image, a video, or rendered content. Similarly, the source data may comprise any of a single frame visual, a sequence of frames of visual data, or a region with a frame or sequence of frames of target data, the source data may further comprise any of an image, a video, or rendered content.

Depending on the visual data being processed, in some embodiments models can be selected for sections of visual data comprising a sequence of frames or a region within a frame or sequence of frames. In these embodiments, each could be necessary in order to provide the most efficient method of developing visual data using the source data and target data.

In some implementations, the detecting of features is based on a predetermined detection metric. In some embodiments, enabling a variety of features to be extracted as set by the predetermined extraction metric ensures the enhancement can be tailored to a particular system. As such, in some of these embodiments the computational expense can be increased or decreased appropriately based on system resources.

In some implementations, the hierarchical algorithm comprises a plurality of layers, which may be sequential, recurrent, recursive, branching or merging.

Having a number of layers in some embodiments, which may or may not be sequential, recurrent, recursive, branching or merging can allow different levels of processing to occur at different times and the layers can work in parallel, ensuring substantially optimal efficiency when enhancing the resolution of the visual data.

In some implementations, the hierarchical algorithm is developed using a learned approach. In some embodiments, hierarchical or non-hierarchical algorithms can be substantially accurate and therefore enable a more accurate reconstruction, for example produce higher quality visual data from the low-quality visual data that is transmitted, for example where quality can be measured by resolution, a perceptual measure or metric determining that the quality is sufficiently aesthetically pleasing. In another example, the hierarchical or non-hierarchical algorithms can produce higher quality versions of visual data using the source data. In some embodiments, a down-sampled version of the resulting visual data comes out to be the same or similar as a down-sampled version of the target data. In some embodiments, using a learned approach can substantially tailor the hierarchical model or models for each portion of visual data.

In some implementations, the learned approach comprises machine learning techniques. The hierarchical algorithm may also comprise one or more convolutional neural networks In some embodiments, non-linear models can be substantially more accurate in reconstructing visual data than dictionary-based approaches. In these embodiments, through using a learning-based approach, i.e. an approach that does not rely on pre-defined visual data features and operators, the model(s) can be substantially optimised for each section or sequence of sections.

In some implementations, the hierarchical algorithm may use super-resolution techniques and/or a spatio-temporal approach.

In some embodiments, for use for a section of visual data, the example based model may be a neural network and can use spatio-temporal convolution. In some embodiments, a spatio-temporal approach may enable a temporal smoothness when the method is applied to more than one frame in a sequence of frames, such as in a video. In some embodiments, a spatio-temporal network can allow an improvement in performance by exploiting the temporal information in the visual data and, for example, within a similar scene in sequential sections of visual data, there may be stationary sections of background in the sequential sections providing information to aid in smoothing any transitions between the sequential sections.

Aspects and/or embodiments include a computer program product comprising software code to effect the method and/or apparatus of other aspects and/or embodiments herein described.

In some aspects and/or embodiments, the terms model and/or algorithm and/or representation and/or parameters and/or functions can be used interchangeably.

Visual data, in some embodiments, may comprise image and/or video data.

References to visual data can be references to video data and/or image data in some aspects and/or embodiments and vice versa. References to low-quality and/or lower-quality can be references to low-resolution and/or lower-resolution in some aspects and/or embodiments and vice versa. References to high-quality and/or higher-quality and/or highest quality and/or original quality can be references to high-resolution and/or higher-resolution and/or highest-resolution and/or original resolution and/or increased fidelity in some aspects and/or embodiments and vice versa. References to sections can be references to frames and/or portions of frames in some aspects and/or embodiments and vice versa. References to enhance or enhancement can be references to upscale and/or upscaling in some aspects and/or embodiments and vice versa.

BRIEF DESCRIPTION OF FIGURES

Embodiments will now be described, by way of example only and with reference to the accompanying drawings having like-reference numerals, in which.

DETAILED DESCRIPTION

Figure 1:
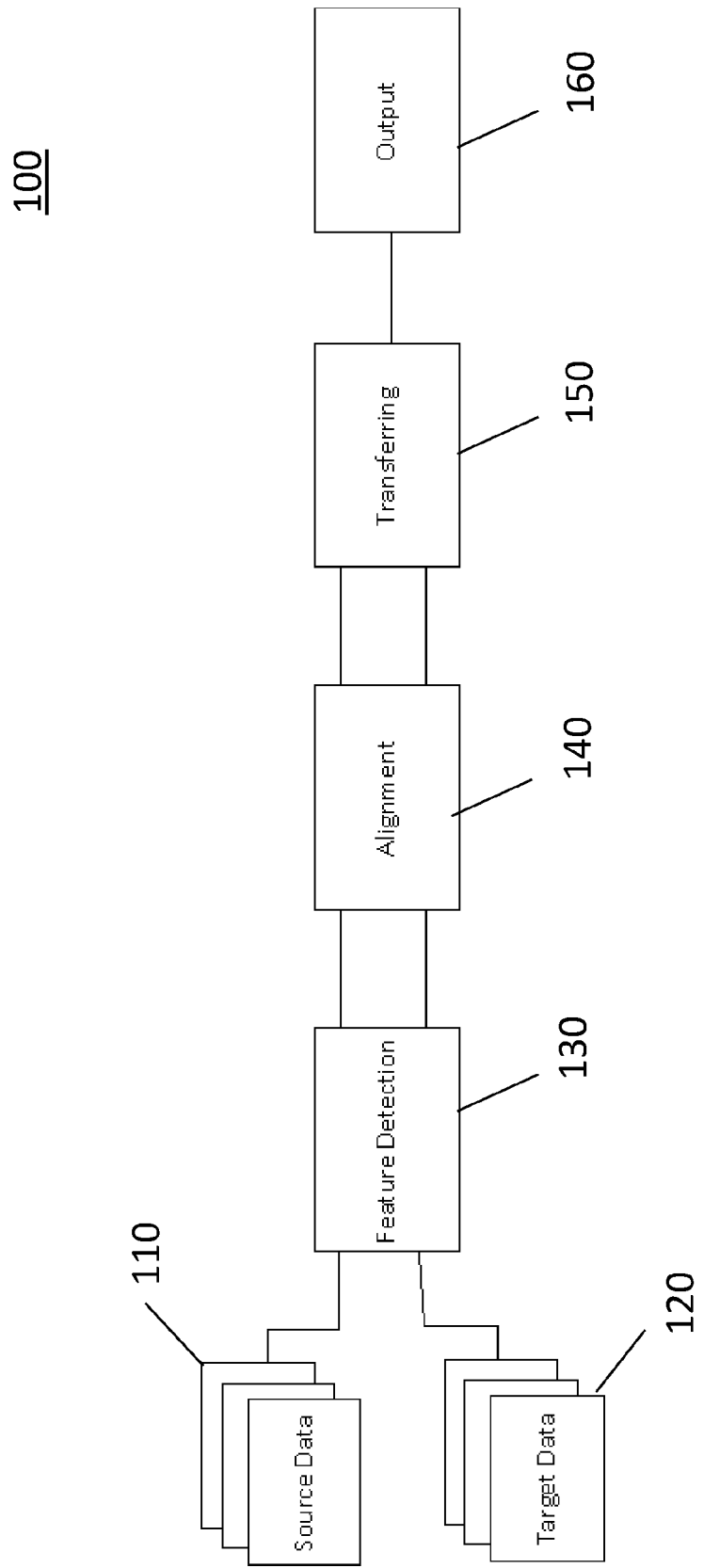
FIG. 1 is a flow chart illustrating an embodiment.
Figure 2:
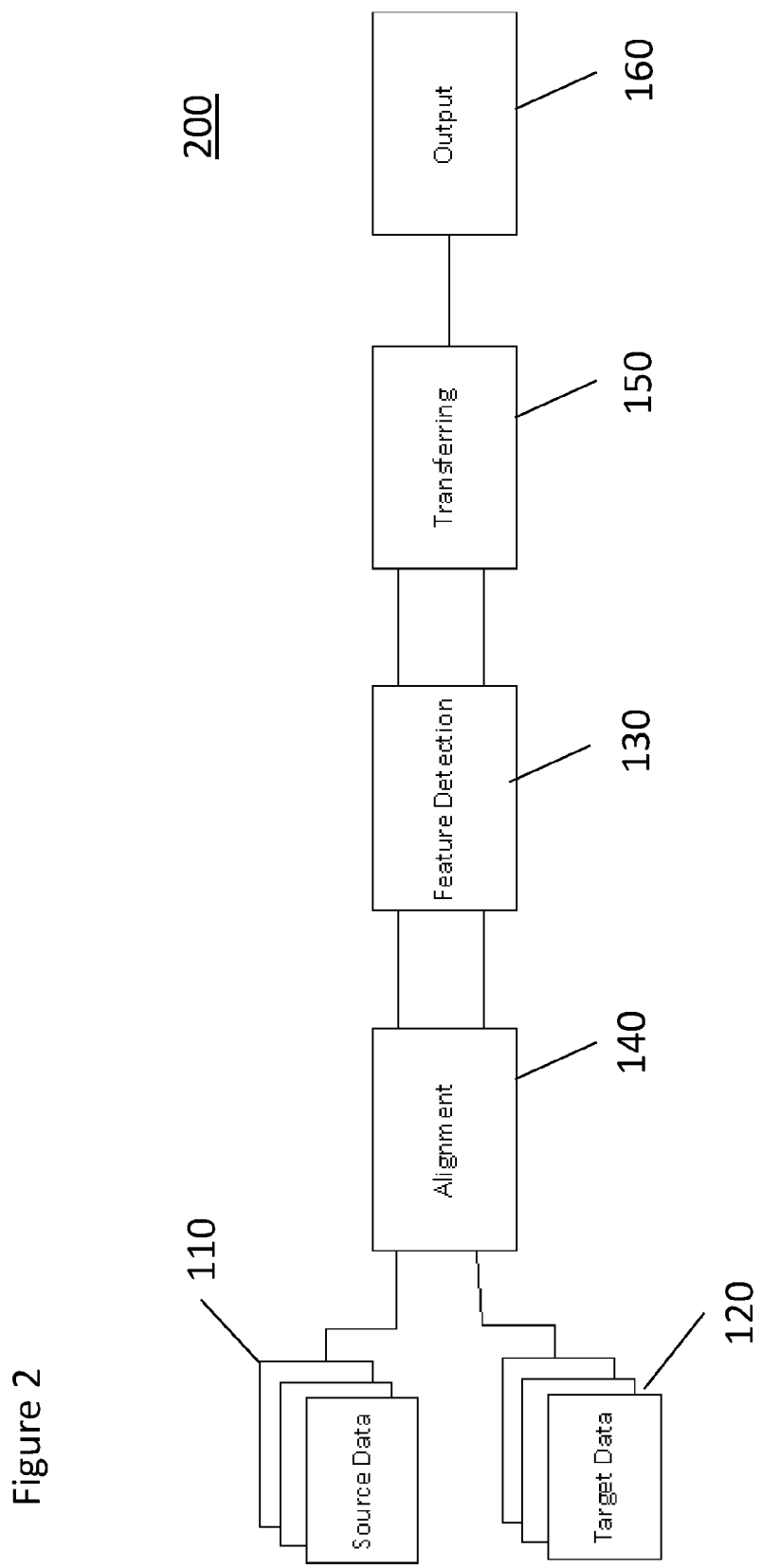
FIG. 2 is a flow chart illustrating a further embodiment.
Figure 3:
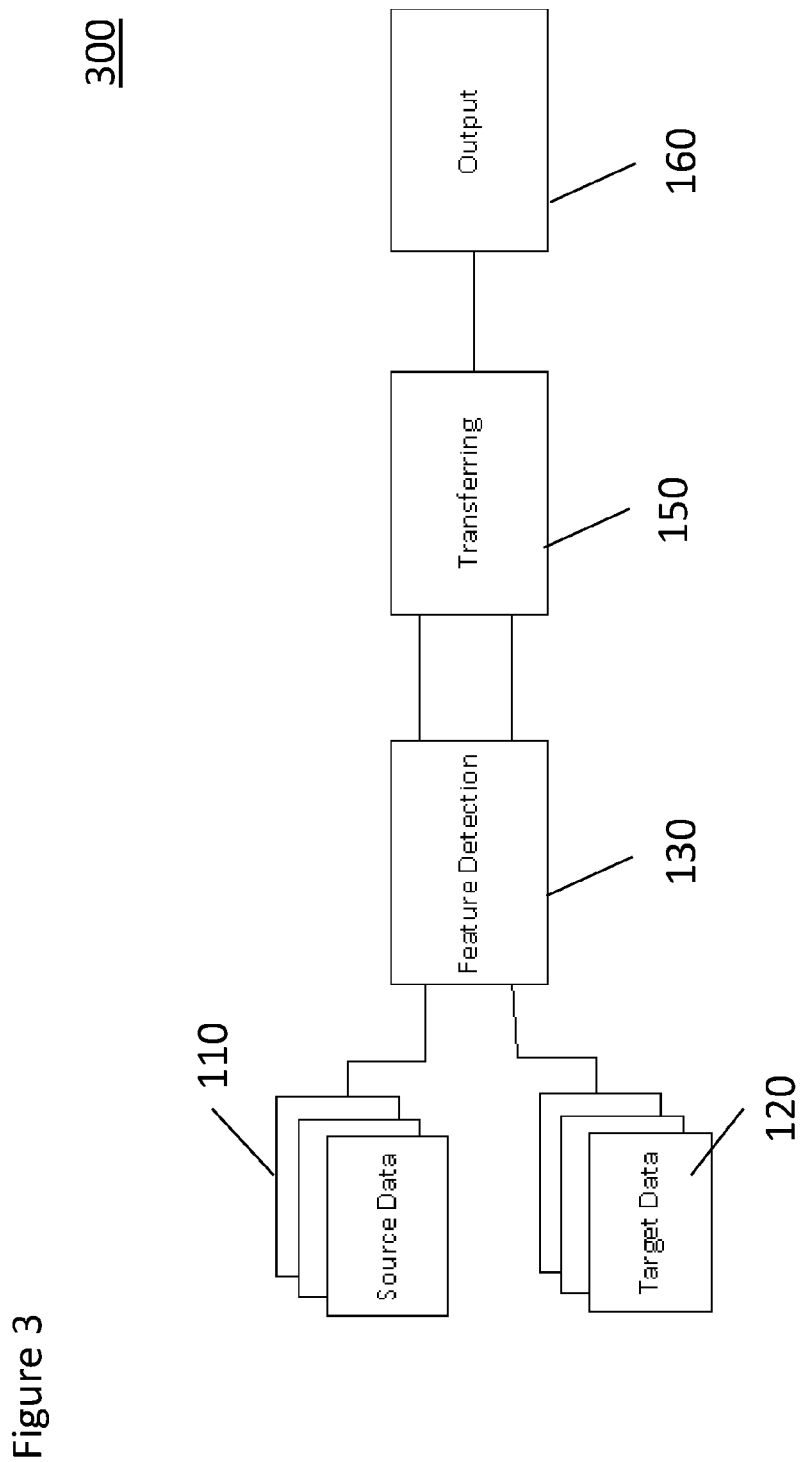
FIG. 3 is a flow chart illustrating a further embodiment.
Figure 4:
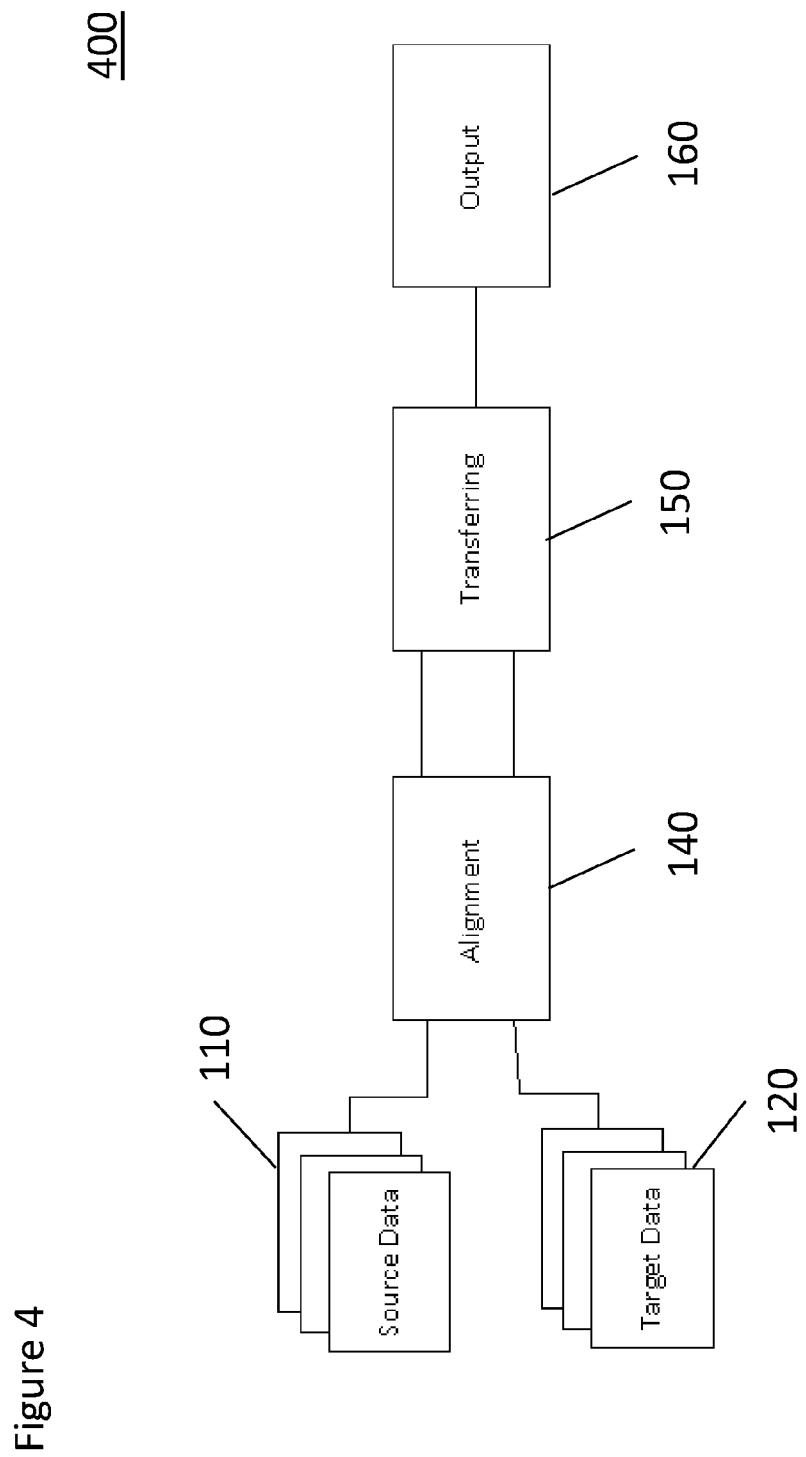
FIG. 4 is a flow chart illustrating a further embodiment.

Various embodiments will now be described below in detail with reference to the Figures referenced above.

FIGS. 1, 2, 3, and 4 illustrate embodiments of the method 100, 200, 300, 400, comprising the steps of inputting source data 110 and target data 120 and producing an output 160. The methods comprise the steps of feature detection 130, alignment 140, and transferring 150 so as to produce output data 160 based on the input source data 110 and target 120 data. Each of the steps will be described in detail below with respect to receiving visual data as the input source data 110 and target 120 data. However, it will be appreciated that other types of data may be used.

At step 130, in some embodiments, visual data 110,120 being received may comprise specific objects which may be detected by predetermined algorithms and methods. For example, in some embodiments visual data 110,120 may contain one or more people. It may be desirable to detect the face of the one or more people within the target data 120 and apply received source data 110 to the faces of the people. It will be appreciated that it may be desirable to detect other objects and or features of one or more people within the visual data.

Feature detection, in some embodiments, may involve a level of feature extraction and a classifier run at multiple scales and region sizes. There are a number of well-known object detection algorithms and methods. For example, when the object is a face the Viola-Jone's haar cascade approach may be used. In other embodiments, alternative feature—based detectors, such as local binary patterns, may be used to detect one or more features within both the source and target data. It will be appreciated that other detection methods and algorithms may be used. In an alternative embodiment, the features may be detected by one or more hierarchical algorithms, such as but not limited to, a convolutional neural network. In other embodiments, the features may be individually selected by a user.

Other embodiments may use a pre-determined classifier which may be any of a Haar feature based cascade classifier, a convolutional neural network, a neural network, a random forest, a decision tree, a linear discriminant analysis classifier, a naïve Bayes classifier, logistic regression, perceptron, a support vector machine or a k-nearest neighbour classifier. Alternatively, features may be detected by maximising a pre-determined similarity metric or by minimizing a distance function or metric.

The detected features may be representative of a face of a person, such as: one or more eyes; the nose; one or more cheeks; the mouth; one or more ears; or one or more eyebrows the forehead, or the hairstyle associated with the face. Additionally, the detected features may be one or more objects, such as an accessory, for example an item of clothing, a pair of glasses a hat, or one or more earrings and/or piercings.

In some embodiments, it will be appreciated that a combination of any of the above methods may be used to detect the one or more features. Alternatively, or in addition to, features may be detected in the source data using one method and in the target data using an alternative method.

At step 140, an alignment between the source data 110 and the target data 120 may be determined. The alignment at step 140 may be undertaken either linearly or non-linearly depending upon the type of transformation applied.

In an embodiment, wherein the alignment is undertaken linearly, the alignment may be undertaken by the application of one or more mathematical transformations. For example, scaling, rotating, shearing or translating the entire source data 110 or target 120 data, or a portion thereof. In method 100, the portion may be the one or more detected features. It will be appreciated that the mathematical transformations are not limited to the ones listed above, but may be any other appropriate function.

In a further embodiment, where the alignment is undertaken non-linearly a grid of one or more control points may be applied to the target data 120 or the source data 110 or one or more of the detected features when the step of detecting features 130 occurs prior to the step of alignment 140 as shown in method 100. In some embodiments, the control points may be arranged in a grid. Once the control points have been applied to the source data 110 and target 120 data, a search for the most optimal arrangement of the control points to determine a warping or deformation field may be undertaken using an iterative optimisation technique. This can enable an alignment between the source data 110 and target 120 data to be determined. At each iteration, the position of the one or more control points may be altered in order to maximise similarity and/or minimise differences. The position of the control points and any changes made to them may be compared to the initial grid positions so as to determine a deformation field and indicate how much warping may be required to align the source and target data. The searching function may be used to determine one or more changes to the plurality of control points so as to provide an alignment between the source data 110 and target data 120 by determining the changes from one piece of data to another and interpolating pixel values between the one or more control points present in each piece of data. In some embodiments, the searching function may be any of a gradient descent, a quasi-Newton method, a conjugate gradient method, an interior point method, a subgradient method, a bundle method of descent, an ellipsoid method, a reduced gradient method, or a simultaneous perturbation stochastic approximation. However, it will be appreciated that other appropriate searching functions may be used.

In a further embodiment, an alignment may be determined between the source data 110 and target 120 data by means of a search using a nearest neighbour algorithm with regards to a plurality of results received from applying one or more predetermined transformations, such as the transformations mentioned above in relation to a linearly application of one or more mathematical transformations.

Aligning the source data 110 and target 120 data may also be performed using keypoint detection and aligning the plurality of keypoints between the source data 110 and target data 120, thereby removing the need for control points as mentioned above. In some embodiments, the plurality of keypoints may be unique points associated with the one or more detected features. Furthermore, alignment of the plurality of keypoints may be undertaken by means of a Procrustes analysis to determine a set of transformation functions needed to align the plurality of keypoints. In some embodiments, it may be desirable to combine keypoint alignment with the use of control points, using the keypoint alignment to obtain an approximate alignment and an initialisation then using control points along with the approximate alignment to obtain a more accurate alignment between the source data 110 and target data 120.

It will be appreciated that the step of alignment 140 may occur after the step of feature detection 130 as indicated in method 100 of FIG. 1. Alignment 140 may also occur before the step of feature detection 130 as indicated in method 200 of FIG. 2, alternatively, there may be no need for alignment 140 as indicated in method 300 of FIG. 3, or no need for feature detection 130 as indicated in method 400 of FIG. 4.

At step 150, a transfer of the data aligned at step 140 or the features detected at step 130, if the step of alignment 140 is not performed, may be undertaken. At step 150, the application/segmentation of the source data 110 and target data 120, using the optionally aligned detected features and combining both the source data 110 and target data 120. The step of application 150 may further comprise the applying a thresholding on the colour channels to provide a mask for specific regions of the data, for example the skin regions where the source data 110 or target data 120 comprises information relating to a person. Alternatively, or in addition to, there may be one or more blending functions applied to the source data 110 or target data 120 so as to remove any indication of any edges in the detected features. In some embodiment, the amount of source data 110 applied to the target data 120 may be controllable by a user of a system designed to execute the method.

In a further embodiment, at step 150, the application of the source data 110 to the target data 120 may only occur over one or more of the features detected at step 130. In another embodiment multiple different source data 110 may be inputted and different features detected at step 130 from the different source data 110 may be applied to different detected features in the target data 120.

It should also be appreciated that particular combinations of the various features described and defined in any aspects can be implemented and/or supplied and/or used independently.

Some of the example embodiments are described as processes or methods depicted as diagrams. Although the diagrams describe the operations as sequential processes, operations may be performed in parallel, or concurrently or simultaneously. In addition, the order or operations may be re-arranged. The processes may be terminated when their operations are completed, but may also have additional steps not included in the figures. The processes may correspond to methods, functions, procedures, subroutines, subprograms, etc.

Methods discussed above, some of which are illustrated by the diagrams, may be implemented by hardware, software, firmware, middleware, microcode, hardware description languages, or any combination thereof. When implemented in software, firmware, middleware or microcode, the program code or code segments to perform the relevant tasks may be stored in a machine or computer readable medium such as a storage medium. A processing apparatus may perform the relevant tasks.

Figure 5:
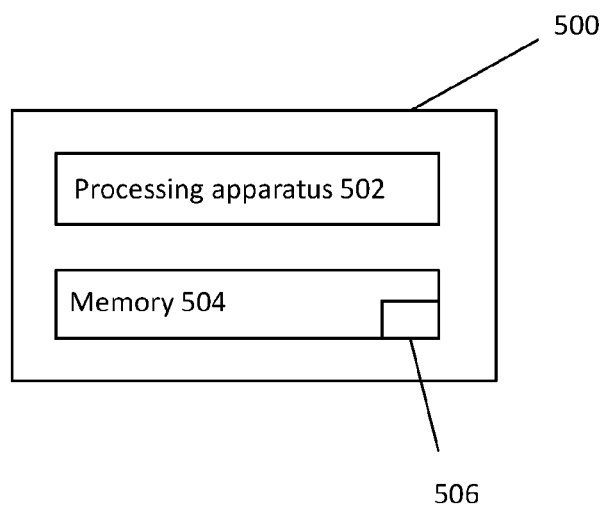
FIG. 5 shows an apparatus comprising a processing apparatus and memory according to an embodiment.

FIG. 5 shows an apparatus 500 comprising a processing apparatus 502 and memory 504 according to an embodiment. Computer-readable code 506 may be stored on the memory 504 and may, when executed by the processing apparatus 502, cause the apparatus 500 to perform methods as described here, for example a method with reference to FIGS. 1 to 4.

The processing apparatus 502 may be of any suitable composition and may include one or more processors of any suitable type or suitable combination of types. Indeed, the term "processing apparatus" should be understood to encompass computers having differing architectures such as single/multi-processor architectures and sequencers/parallel architectures. For example, the processing apparatus may be a programmable processor that interprets computer program instructions and processes data. The processing apparatus may include plural programmable processors. Alternatively, the processing apparatus may be, for example, programmable hardware with embedded firmware. The processing apparatus may alternatively or additionally include Graphics Processing Units (GPUs), or one or more specialised circuits such as field programmable gate arrays FPGA, Application Specific Integrated Circuits (ASICs), signal processing devices etc. In some instances, processing apparatus may be referred to as computing apparatus or processing means.

The processing apparatus 502 is coupled to the memory 504 and is operable to read/write data to/from the memory 504. The memory 504 may comprise a single memory unit or a plurality of memory units, upon which the computer readable instructions (or code) is stored. For example, the memory may comprise both volatile memory and non-volatile memory. In such examples, the computer readable instructions/program code may be stored in the non-volatile memory and may be executed by the processing apparatus using the volatile memory for temporary storage of data or data and instructions. Examples of volatile memory include RAM, DRAM, and SDRAM etc. Examples of non-volatile memory include ROM, PROM, EEPROM, flash memory, optical storage, magnetic storage, etc.

An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Methods described in the illustrative embodiments may be implemented as program modules or functional processes including routines, programs, objects, components, data structures, etc., that perform particular tasks or implement particular functionality, and may be implemented using existing hardware. Such existing hardware may include one or more processors (e.g. one or more central processing units), digital signal processors (DSPs), application-specific-integrated-circuits, field programmable gate arrays (FPGAs), computers, or the like.

Unless specifically stated otherwise, or as is apparent from the discussion, terms such as processing or computing or calculating or determining or the like, refer to the actions and processes of a computer system, or similar electronic computing device. Note also that software implemented aspects of the example embodiments may be encoded on some form of non-transitory program storage medium or implemented over some type of transmission medium. The program storage medium may be magnetic (e.g. a floppy disk or a hard drive) or optical (e.g. a compact disk read only memory, or CD ROM), and may be read only or random access. Similarly the transmission medium may be twisted wire pair, coaxial cable, optical fibre, or other suitable transmission medium known in the art. The example embodiments are not limited by these aspects in any given implementation.

Further embodiments are illustrated by the following examples.

Example 1

A method for developing visual data from source data, target data and using a hierarchical algorithm, the method comprising the steps of:
determining an alignment between the target data and the source data; and
producing the visual data by transferring one or more features of the source data onto one or more features of the target data;
wherein, the visual data is produced after the step of determining the alignment between the target data and the source data; and wherein the visual data is produced using the hierarchical algorithm.

Example 2

The method of example 1, further comprising the steps of: detecting one or more features within the target data; and detecting one or more features within the source data.

Example 3

The method of example 2, wherein the step of determining an alignment between the target data and the source data occurs prior to the step of detecting one or more features within the target data and the source data.

Example 4

The method of example 2, wherein the step of determining an alignment between the target data and the source data occurs after the step of detecting one or more features within the target and source data, and wherein the step of determining an alignment occurs between the one or more detected features in the source data and the one or more detected features in the target data.

Example 5

The method of any of examples 2 to 4, wherein the one or more detected features within the source data comprises data indicative of a predetermined object.

Example 6

The method of example 5, wherein the predetermined object is a face of a person or facial features.

Example 7

The method of any previous example, further comprising a step of segmenting the source data and/or target data.

Example 8

The method of any previous example, wherein the step of producing the visual data by transferring one or more features of the source data onto one or more features of the target data occurs using one or more predetermined regions of the source data.

Example 9

The method of any previous example, wherein the step of producing the visual data by transferring one or more features of the source data onto one or more features of the target data occurs using one or more predetermined regions of the target data.

Example 10

The method of any previous example, wherein the target data comprises data indicative of a predetermined object.

Example 11

The method of example 10, wherein the predetermined object is a face of a person or facial features.

Example 12

The method of example 10, wherein the predetermined object may be an accessory.

Example 13

The method of example 12, wherein an accessory may be any of a hat, glasses, mask, an item of clothing, or one or more piercings and/or earrings.

Example 14

The method of any of examples 2 to 13, wherein the step of detecting one or more features comprises using one or more predetermined classifiers.

Example 15

The method of example 14, wherein the predetermined classifier is any one or more of a Haar Feature-based Cascade classifier, a convolutional neural network, a neural network, a random forest, a decision tree, a Linear Discriminant Analysis classifier, a Naïve Bayes classifier, Logistic regression, perceptron, a support vector machine, or a k-nearest neighbour classifier.

Example 16

The method of any previous example, comprising the step of receiving the plurality of source data.

Example 17

The method of any previous example, further comprising the step of receiving the target data.

Example 18

The method of any previous example, wherein the target data comprises a plurality of target visual data.

Example 19

The method of any previous example, wherein the plurality of source data is selected such that a pre-determined similarity metric is maximized, or a distance function or metric is minimized.

Example 20

The method of any previous example, wherein the step of determining the alignment between the one or more features comprises a linear transformation function.

Example 21

The method of example 20, wherein the linear transformation function is at least one of; a scaling function, a rotation function, a translation function, or a shearing function.

Example 22

The method of any of examples 20 or 21, wherein the linear transformation function is applied to at least one of the target data, the source data.

Example 23

The method of any of examples 20 to 22, when dependent upon example 2, wherein the linear transformation function is applied to at least one of the detected features within the target data, or the detected features within the source data.

Example 24

The method of any previous example, wherein the step of determining the alignment between the one or more features comprises a non-linear transformation function.

Example 25

The method of example 24, wherein the non-linear transformation function comprises the step of applying a plurality of control points to at least one of the target data, the source data, the detected features within the target data, or the detected features within the source data.

Example 26

The method of any of examples 24 or 25 when dependent upon example 2, where in the non-linear transformation function comprises applying a plurality of control points to at least one of the detected features within the target data, or the detected features within the source data.

Example 27

The method of example 25, wherein the control points are arranged in a grid.

Example 28

The method of any of examples 25 or 27, wherein the non-linear transformation function further comprises searching for one or more changes to the plurality of control points so as to align the target data with the source data.

Example 29

The method of example 28, wherein searching is performed by any of a gradient descent, a quasi-Newton method, a conjugate gradient method, an interior point method, a subgradient method, a bundle method of descent, an ellipsoid method, a reduced gradient method, or a simultaneous perturbation stochastic approximation.

Example 30

The method of example 28, wherein searching is performed by a nearest neighbour search with regards to a plurality of results received from applying a plurality of predetermined transformations.

Example 31

The method of any previous example, wherein the step of determining the alignment between the source data and the target data comprises steps of detecting a plurality of keypoints, and aligning the plurality of keypoints.

Example 32

The method of example 31, wherein the keypoints are determined for at least one of the target data, the source data.

Example 33

The method of any of examples 31 or 32, when dependent upon example 2, wherein the keypoints are determined for at least on of the detected features within the target data, or the detected features within the source data.

Example 34

The method of any of examples 31 to 33, wherein the step of determining the alignment between the one or more features further comprises applying a Procrustes analysis to determine a set of transformation functions to align the plurality of keypoints.

Example 35

The method of example 34, wherein the set of transformation functions comprises at least one linear transformation function or non-linear transformation function.

Example 36

The method of any of examples 31 to 35, wherein a keypoint is a unique point associated with one or more detected features.

Example 37

The method of example 36 wherein the unique point is defined in the feature space and/or the native pixel space.

Example 38

The method of any previous example, wherein the step of determining the alignment between the source data and the target data is performed using a predetermined alignment algorithm.

Example 39

The method of example 38, wherein the alignment algorithm is a hierarchical algorithm.

Example 40

The method of any of examples 38 or 39, wherein the alignment algorithm receives a first and second data, and learns to align the first data with the second data.

Example 41

The method of any of examples 38 or 39, wherein the alignment algorithm receives a first data and learns to align the first data with a second data stored in memory Example 42

The method of any previous example, wherein the step of producing the visual data comprises the step of determining one or more thresholds on the colour channels of the target data.

Example 43

The method of any previous example, wherein the step of producing the visual data occurs on a segment of the target image.

Example 44

The method of any previous example, when dependent upon example 2, where in the step of producing the visual data occurs on a subset of the detected features.

Example 45

The method of example 6 or example 11 when dependent upon example 2, wherein the one or more detected features is representative of any one or more of, an eye of the person, both eyes of the person, an ear of the person, both ears of the person, a nose of the person, a mouth of the person, a chin of the person, an eyebrow of the person, both eyebrows of the person, a cheek of the person, both cheeks of the person, a forehead of the person, the head of a person, a plurality of hairs or hairstyle of the person, or any point within.

Example 46

The method of any previous example, wherein the amount of source data applied to the target data is controllable by a user of a system designed to execute the method.

Example 47

The method of any previous example, wherein different source data is applied to the one or more detected features.

Example 48

The method of any previous example, further comprising the step of blending the applied source data with the target data.

Example 49

The method of any previous example, wherein the target data comprises any of a single frame visual, a sequence of frames of target data, or a region with a frame or sequence of frames of target data.

Example 50

The method of any previous example, wherein the target data is any of an image, a video, or rendered content.

Example 51

The method of any previous example, wherein the source data comprises any of a single frame visual, a sequence of frames of visual data, or a region within a frame or sequence of frames of target data.

Example 52

The method of any previous example, wherein the source data comprises any of an image, a video, or rendered content.

Example 53

The method of any previous example, wherein the detecting of features is dependent based on a predetermined detection metric.

Example 54

The method of any previous example, wherein the hierarchical algorithm comprises a plurality of layers.

Example 55

The method of example 54, wherein the layers are any of sequential, recurrent, recursive, branching or merging.

Example 56

The method of any previous example, wherein the hierarchical algorithm is developed using a learned approach.

Example 57

The method of example 56, wherein the learned approach comprises machine learning techniques.

Example 58

The method of any previous example, wherein the hierarchical algorithm comprises one or more convolutional neural networks.

Example 59

The method of any previous example, wherein the hierarchical algorithm uses super-resolution techniques.

Example 60

The method of any previous example, wherein the hierarchical algorithm uses a spatio-temporal approach.

Example 61

The method of any previous example, wherein the visual data comprises at least one high fidelity input.

Example 62

The method of example 61, wherein fidelity can be measured subjectively.

Example 63

The method substantially as hereinbefore described in relation to FIGS. 1 to 4.

Example 64

Apparatus for carrying out the method of any previous example.

Example 65

A computer program product comprising software code for carrying out the method of any of examples 1 to 63.

Example 66

Apparatus comprising:
at least one processor;
at least one memory including computer program code which, when executed by the at least one processor, causes the apparatus to perform the method of any one of examples 1 to 63.

Example 67

A computer readable medium having computer readable code stored thereon, the computer readable code, when executed by at least one processor, causing the performance of the method of any one of examples 1 to 63.

What is claimed is:

1. A non-transitory program storage medium comprising computer readable instructions stored thereon, the instructions, when executed by a processing apparatus, being configured to cause the processing apparatus to:
   detect one or more features indicative of a predetermined object within source data;
   detect one or more features indicative of the predetermined object within target data;
   transfer the one or more features indicative of the predetermined object within the source data onto the one or more features indicative of the predetermined object within the target data; and
   produce visual data by performing a blending function on at least one of the source data or the target data to remove an indication of an edge in at least one of:
      the one or more features indicative of the predetermined object within the source data, or
      the one or more features indicative of the predetermined object within the target data.

2. The non-transitory program storage medium of claim 1, wherein detecting the one or more features indicative of the predetermined object within the source data comprises using one or more predetermined classifiers.

3. The non-transitory program storage medium of claim 2, wherein the one or more predetermined classifiers includes one or more of a Haar Feature-based Cascade classifier, a convolutional neural network, a neural network, a random forest, a decision tree, a Linear Discriminant Analysis classifier, a Naive Naïve classifier, Logistic regression, perceptron, a support vector machine, or a k-nearest neighbor classifier.

4. The non-transitory program storage medium of claim 2, wherein the one or more predetermined classifiers are run at multiple scales and region sizes.

5. The non-transitory program storage medium of claim 1, wherein producing the visual data includes using one or more predetermined regions of the source data.

6. The non-transitory program storage medium of claim 1, wherein producing the visual data includes using one or more predetermined regions of the target data.

7. The non-transitory program storage medium of claim 1, wherein the one or more features indicative of the predetermined object within the source data are detected using a hierarchical algorithm.

8. The non-transitory program storage medium of claim 1, wherein the predetermined object includes one or more of an eye of a person, both eyes of the person, an ear of the person, both ears of the person, a nose of the person, a mouth of the person, a chin of the person, an eyebrow of the person, both eyebrows of the person, a cheek of the person, both cheeks of the person, a forehead of the person, a head of the person, or a plurality of hairs of the person.

9. The non-transitory program storage medium of claim 1, wherein the instructions are further configured to cause the processing apparatus to select the source data based on a similarity metric.

10. The non-transitory program storage medium of claim 1, wherein the instructions are further configured to cause the processing apparatus to select the source data based on a distance function.

11. The non-transitory program storage medium of claim 1, wherein an amount of the source data applied to the target data is controllable by a user of the processing apparatus.

12. A non-transitory program storage medium comprising computer readable instructions stored thereon, the instructions, when executed by a processing apparatus, being configured to cause the processing apparatus to:
  detect one or more features indicative of a predetermined object within source data;
  detect one or more features indicative of the predetermined object within target data;
  determine at least a source control point in the one or more features indicative of the predetermined object within the source data;
  determine at least a target control point in the one or more features indicative of the predetermined object within the target data;
  determine an alignment between the source control point and the target control point; and
  produce visual data by transferring the one or more features indicative of the predetermined object within the source data onto the one or more features indicative of the predetermined object within the target data based on the determined alignment.

13. The non-transitory program storage medium of claim 12, wherein the instructions are further configured to cause the processing apparatus to:
  apply a blending function as part of transferring the one or more features.

14. The non-transitory program storage medium of claim 12, wherein the source control point is one of two or more control points of the source data and the target control point is one of two or more control points of the target data and determining the alignment includes:
  applying a grid of the two or more control points to the target data;
  applying a grid of the two or more control points to the source data; and
  determining a deformation field using an iterative optimization technique by searching for an optimal arrangement of the control points.

15. The non-transitory program storage medium of claim 14, wherein searching may be any of gradient descent, a quasi-Newton method, a conjugate gradient method, an interior point method, a subgradient method, a bundle method of descent, an ellipsoid method, a reduced gradient method, or a simultaneous perturbation stochastic approximation.

16. The non-transitory program storage medium of claim 12, wherein the one or more features are detected using a neural network.

17. The non-transitory program storage medium of claim 16, wherein determining the alignment comprises determining the alignment between the source control point and the target control point using a learned spatial transformer network.

18. The non-transitory program storage medium of claim 12, wherein determining the alignment includes providing as input to a learned spatial transformer network the one or more features indicative of the predetermined object within the source data and the one or more features indicative of the predetermined object within the target data, wherein the learned spatial transformer network determines the alignment.

19. A system for developing visual data from source data, target data and using a non-linear transformation, the system comprising:
  at least one processor; and
  memory storing instructions that, when executed by the at least one processor, cause the system to perform operations including:
    determining an alignment between the target data and the source data, and
    producing the visual data by transferring one or more features of the source data onto one or more features of the target data,
    wherein the visual data is produced after determining the alignment between the target data and the source data, and
    wherein the visual data is produced using the non-linear transformation.

20. The system of claim 19, wherein determining the alignment includes a Procrustes analysis to determine a set of transformation functions to align a plurality of keypoints.

* * * * *